United States Patent
Moser

(10) Patent No.: US 12,536,046 B2
(45) Date of Patent: Jan. 27, 2026

(54) REVERSE LINKAGE OF AUXILIARY RESOURCES TO A RESOURCE LOCATION AND RESOURCE-RECEIVING ENTITY

(71) Applicant: BANK OF AMERICA CORPORATION, Charlotte, NC (US)

(72) Inventor: Jill Marie Moser, Louisville, KY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 595 days.

(21) Appl. No.: 17/684,167

(22) Filed: Mar. 1, 2022

(65) Prior Publication Data
US 2023/0281048 A1     Sep. 7, 2023

(51) Int. Cl.
*G06F 9/50* (2006.01)
*G06F 3/06* (2006.01)

(52) U.S. Cl.
CPC .......... *G06F 9/5033* (2013.01); *G06F 3/0604* (2013.01); *G06F 3/0638* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,253,152 B1 | 2/2016 | Chen et al. | |
| 9,270,705 B1 | 2/2016 | Chen et al. | |
| 9,338,225 B2 | 5/2016 | Jalan et al. | |
| 9,386,088 B2 | 7/2016 | Zheng et al. | |
| 9,531,846 B2 | 12/2016 | Han et al. | |
| 9,552,200 B1 | 1/2017 | Dufresne | |
| 9,588,759 B1 | 3/2017 | Dufresne | |
| 9,602,442 B2 | 3/2017 | Han | |
| 9,609,052 B2 | 3/2017 | Jalan et al. | |
| 9,654,639 B1 | 5/2017 | Balarajan et al. | |
| 9,686,406 B1 | 6/2017 | Lopez et al. | |
| 9,703,549 B2 | 7/2017 | Dufresne | |
| 11,184,292 B1 | 11/2021 | Tatti et al. | |
| 11,588,748 B1 | 2/2023 | Dehenre et al. | |
| 2005/0257141 A1 | 11/2005 | Brandrud et al. | |
| 2012/0323657 A1* | 12/2012 | Tiku | G06Q 20/384 705/14.17 |
| 2013/0290087 A1 | 10/2013 | Merwarth et al. | |

(Continued)

OTHER PUBLICATIONS

IBM, "Security Planning and setting up system security", 2021, https://www.ibm.com/docs/en/ssw_ibm_i_75/pdf/rzamvpdf.pdf (Year: 2021).

*Primary Examiner* — Chat C Do
*Assistant Examiner* — William C Wood
(74) *Attorney, Agent, or Firm* — Moore & Van Allen PLLC; Anup Iyer

(57) ABSTRACT

Reverse linkage of auxiliary resources to both a resource-receiving entity and a resource storage location associated with a resource-providing entity. The reverse nature of the linkage is realized, in that, the linkage occurs in response to one or more resource events occurring between the resource-providing entity and the resource-receiving entity. As a result of the linkage, the present invention provides for the auxiliary resources to be automatically applied to an incurring subsequent, typically next-in-time, resource event conducted between the resource-providing entity and the resource-receiving entity using the linked resource storage location.

14 Claims, 4 Drawing Sheets

(56) References Cited

U.S. PATENT DOCUMENTS

| | | |
|---|---|---|
| 2014/0310332 A1 | 10/2014 | Huang et al. |
| 2015/0019621 A1 | 1/2015 | Kao |
| 2015/0019735 A1 | 1/2015 | Pogrebinsky et al. |
| 2015/0039671 A1 | 2/2015 | Jalan et al. |
| 2015/0379554 A1* | 12/2015 | Copeland ........... G06Q 30/0239 |
| | | 705/14.39 |
| 2015/0381424 A1 | 12/2015 | Maetz et al. |
| 2016/0217461 A1 | 7/2016 | Gaddam et al. |
| 2016/0267411 A1 | 9/2016 | Li et al. |
| 2016/0267592 A1* | 9/2016 | Djurdjevic .......... G06F 16/9535 |
| 2017/0032303 A1 | 2/2017 | Shubat |
| 2019/0130496 A1* | 5/2019 | Aroli Veettil .......... G06Q 20/12 |
| 2019/0188744 A1* | 6/2019 | Kandasamy ....... G06Q 30/0215 |
| 2023/0205930 A1 | 6/2023 | Chien et al. |

\* cited by examiner

REVERSE LINKAGE OF AUXILIARY
RESOURCES TO A RESOURCE LOCATION
AND RESOURCE-RECEIVING ENTITY

FIELD OF THE INVENTION

The present invention is related to resource event processing and, more specifically reverse linking of auxiliary resources to a resource storage location and resource-receiving entity for use of the auxiliary resources during a subsequent resource event at the resource-receiving entity.

BACKGROUND

Typically, auxiliary resources are linked to a resource storage location by a resource-providing entity selecting a resource-receiving entity prior to conducting resource events with the resource-receiving entity. In this regard, the auxiliary resources serve to induce the resource-providing entity to conduct initial resource events with resource-receiving entities that they may otherwise not be prone to conduct such resource events with. However, no means currently exists to link auxiliary resources to a resource storage location and resource-receiving entity for purposes of inducing the resource-providing entity to conduct a repetitive resource event with the resource-receiving entity.

Therefore, a need exists to develop systems, methods and the like for linking auxiliary resources to a resource storage location and resource-receiving entity for purposes of inducing the resource-providing entity to conduct a repetitive resource event with the resource-receiving entity.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for reverse linkage of auxiliary resources to both a resource-receiving entity and a resource storage location associated with a resource-providing entity, in response to one or more resource events occurring between the resource-providing entity and the resource-receiving entity. As a result of such a linkage, the present invention provides for the auxiliary resources to be automatically applied, in real-time, to a subsequent, typically next-in-time, resource event conducted between the resource-providing entity and the resource-receiving entity that uses the linked resource storage location.

Specifically, in response to a resource event conducted between a resource-receiving entity and resource-providing entity that uses a resource storage location associated with the resource-providing entity, a determination is made that the first resource event invokes auxiliary resources and, in response, determines the volume of the auxiliary resources and subsequently links the auxiliary resources to the resource-providing entity and the resource storage location. When a subsequent resource event occurs between the resource-providing entity and the resource-receiving entity, the link between the auxiliary resources and both the resource-providing entity and the resource storage location is acknowledged, and auxiliary resource usage rules are implemented to determine whether the auxiliary resources are applicable to the subsequent resource event. If it is determined that the auxiliary resources are applicable to the subsequent resource event, the auxiliary resources are applied against the volume of resources required to conduct the subsequent resource event.

A system for reverse auxiliary resource linkage and auxiliary resource usage defines first embodiments of the invention. The system includes a network storage entity configured to provide a plurality of resource storage locations. In addition, the system includes a first computing platform having a first memory and one or more first computing processor devices in communication with the first memory. First memory stores an auxiliary resource linking engine that is executable by at least one of the computing processor devices. Auxiliary resource linking engine is configured to, in response to execution of a first resource event conducted between a resource-providing entity and a resource-receiving entity using a resource storage location from amongst the plurality of resource storage locations that is associated with the resource-providing entity, determine that the first resource event invokes auxiliary resources and, in response, determine a volume of the auxiliary resources. In response to determining the volume of auxiliary resources, auxiliary resource linking engine is further configured to access the network storage entity and link the resource storage location to the auxiliary resources of the determined volume and the resource-receiving entity. The system additionally includes a second computing platform having a second memory and one or more second computing processor devices in communication with the second memory. Second memory stores an auxiliary resource usage determining and application engine that is executable by at least one of the computing processor devices. Auxiliary resource usage determining and application engine is configured to, in response to initiation of a second resource event conducted between the resource-providing entity and the resource-receiving entity using the resource storage location, access the network storage entity to determine that the resource storage location is linked to the auxiliary resources of the determined volume and the resource-receiving entity and, in response, apply auxiliary resource usage rules to determine whether the auxiliary resources are applicable to the second resource event. In response to determining that the auxiliary resources are applicable to the second resource event, auxiliary resource usage determining and application engine is further configured to apply the auxiliary resources against a volume of resources required to conduct the second resource event.

In specific embodiments of the system, the auxiliary resource linking engine is further configured to determine that the first resource event invokes auxiliary resources based on (i) a volume of resources required to conduct the first resource event or (ii) a predetermined cumulative volume of resources required to conduct a plurality of resource events between the resource-providing entity and the resource-receiving entity. In other related embodiments of the system, the auxiliary resource linking engine is further configured to determine that the first resource event invokes auxiliary resources based on a type of one or more objects distributed in the first resource event.

In further specific embodiments of the system, the auxiliary resource linking engine is further configured to determine the volume of the auxiliary resources based on a percentage of (i) resources required to conduct the first resource event, or (ii) a predetermined cumulative volume of resources required to conduct a plurality of resource events between the resource-providing entity and the resource-receiving entity.

In other specific embodiments of the system, the auxiliary resource linking engine is further configured to, prior to linking the resource location to the volume of auxiliary resources and the resource-receiving entity, apply a timestamp to the auxiliary resources. In such embodiments of the system, the link between the resource storage location and auxiliary resources and the resource-receiving entity is configured to expire after a predetermined period of time as determined from the timestamp.

In still further specific embodiments of the system, the auxiliary resource usage rules define one or more of (i) a time period for usage of the auxiliary resources, (ii) a minimum volume of resources required to conduct the second resource event, (iii) a volume of resource events conducted between the resource-providing entity and the resource-receiving entity since the first resource event, and (iv) a type of object being conveyed in the second resource event.

Moreover, in additional specific embodiments of the system, the auxiliary resource linking engine is further configured to, in response to linking the resource location to the volume of auxiliary resources and the resource-receiving entity, initiate communication, to the resource-providing entity, of an alert that includes the volume of auxiliary resources and applicable auxiliary resource usage rules.

A computer-implemented method for reverse auxiliary resource linkage and usage defines second embodiments of the invention. The computer-implemented method is executed by one or more computing processor devices. The method includes, in response to execution of a first resource event conducted between a resource-providing entity and a resource-receiving entity using a resource storage location associated the resource-receiving entity, determining that the first resource event invokes auxiliary resources and, in response, determining a volume of the auxiliary resources. In response to determining the volume of auxiliary resources, the method further includes accessing the resource storage location and linking the resource storage location to the volume of auxiliary resources and the resource-receiving entity. Further, the method includes, in response to initiation of a second resource event conducted between the resource-providing entity and the resource-receiving entity using the resource storage location, accessing the resource storage location to determine that the resource storage location is linked to the volume of auxiliary resources and the resource-receiving entity and, in response, applying auxiliary resource usage rules to determine whether the auxiliary resources are applicable to the second resource event. In response to determining that the auxiliary resources are applicable to the second resource event, the method further includes applying the auxiliary resources against a volume of resources required to conduct the second resource event.

In specific embodiments of the computer-implemented method, determining that the resource first event invokes the auxiliary resources further includes determining that the first resource event invokes the auxiliary resources based on (i) a volume of resources required to conduct the first resource event or (ii) a predetermined cumulative volume of resources required to conduct a plurality of resource events between the resource-providing entity and the resource-receiving entity. In other related embodiments of the computer-implemented method, determining that the first resource event invokes the auxiliary resources further includes determining that the first resource event invokes the auxiliary resources based on a type of one or more objects distributed in the first resource event.

In additional specific embodiments of the computer-implemented method, determining the volume of the auxiliary resources further includes determining the volume of the auxiliary resources based on a percentage of (i) resources required to conduct the first resource event or (ii) a predetermined cumulative volume of resources required to conduct a plurality of resource events between the resource-providing entity and the resource-receiving entity.

In additional specific embodiments of the computer-implemented method includes, prior to linking the resource storage location to the volume of auxiliary resources and the resource-receiving entity, applying a timestamp to the auxiliary resources. In such embodiments of the method, the link between the resource storage location and the volume of auxiliary resources and the resource-receiving entity is configured to expire after a predetermined period of time as determined from the timestamp.

In further specific embodiments of the computer-implemented method, applying the auxiliary resource usage rules further defines the auxiliary resource usage rules as one or more of (i) a time period for usage of the auxiliary resources, (ii) a minimum volume of resources required to conduct the second resource event, (iii) a volume of resource events conducted between the resource-providing entity and the resource-receiving entity since the first resource event, and (iv) a type of object being conveyed in the second resource event.

Moreover, in additional embodiments, the computer-implemented method further includes, in response to linking the resource storage location to the volume of auxiliary resources and the resource-receiving entity, initiating communication, to the resource-providing entity, of an alert that includes the volume of auxiliary resources and applicable auxiliary resource usage rules.

A computer program product including a non-transitory computer-readable medium defines third embodiments of the invention. The computer-readable medium includes a first set of codes for causing at least one computing processor device to, in response to execution of a first resource event conducted between a resource-providing entity and a resource-receiving entity using a resource storage location associated the resource-receiving entity, determine that the first resource event invokes auxiliary resources. In addition, the computer-readable medium includes a second set of codes for causing at least one computing processor device to, in response to determining first resource event invokes auxiliary resources, determine a volume of the auxiliary resources. Further, the computer-readable medium includes a third set of codes for causing at least one computing processor device to, in response to determining the volume of auxiliary resources, access the resource storage location and link the resource storage location to the volume of auxiliary resources and the resource-receiving entity. Additionally, the computer-readable medium includes a fourth set of codes for causing at least one computing processor device to, in response to initiation of a second resource event conducted between the resource-providing entity and the resource-receiving entity using the resource storage location, access the resource storage location to determine that the resource storage location is linked to the volume of auxiliary resources and the resource-receiving entity. Moreover, the computer-readable medium includes a fifth set of codes for causing at least one computing processor device to, in response to determining that the resource storage location is linked to the volume of auxiliary resources and the resource-receiving entity, apply auxiliary resource usage rules to determine whether the auxiliary resources are applicable to the second resource event, and a sixth set of codes for causing at least one computing processing device to, in response to determining that the auxiliary resources are applicable to the second resource event, apply the auxiliary resources against a volume of resources required to conduct the second resource event.

In specific embodiments of the computer program product, the first set of codes is further configured to cause the at least one computing processor device to determine that the first resource event invokes the auxiliary resources based on (i) a volume of resources required to conduct the first resource event or (ii) a predetermined cumulative volume of resources required to conduct a plurality of resource events between the resource-providing entity and the resource-receiving entity. In related embodiments of the computer program product, the first set of codes is further configured to cause the at least one computing processor device to determine that the first resource event invokes the auxiliary resources based on a type of one or more objects distributed in the first resource event.

In other specific embodiments of the computer program product, the second set of codes is further configured to cause the at least one computing processor device to determine the volume of the auxiliary resources based on a percentage of (i) resources required to conduct the first resource event or (ii) a predetermined cumulative volume of resources required to conduct a plurality of resource events between the resource-providing entity and the resource-receiving entity.

In further specific embodiments of the computer program product, the computer-readable medium further includes a seventh set of codes for causing at least one computing processor device to, prior to linking the resource storage location to the volume of auxiliary resources and the resource-receiving entity, applying a timestamp to the auxiliary resources. In such embodiments of the computer program product, the link between the resource storage location and the volume of auxiliary resources and the resource-receiving entity is configured to expire after a predetermined period of time as determined from the timestamp.

Moreover, in additional specific embodiments of the computer program product, the fifth set of codes is further configured to cause the at least one computing processor device to apply the auxiliary resource usage rules, wherein the auxiliary resource usage rules are defined as one or more of (i) a time period for usage of the auxiliary resources, (ii) a minimum volume of resources required to conduct the second resource event, (iii) a volume of resource events conducted between the resource-providing entity and the resource-receiving entity since the first resource event, and (iv) a type of object being conveyed in the second resource event.

Thus, according to embodiments of the invention, which will be discussed in greater detail below, the present invention provides for reverse linkage of auxiliary resources to both a resource-receiving entity and a resource storage location associated with a resource-providing entity. The reverse nature of the linkage is realized, in that, the linkage occurs in response to one or more resource events occurring between the resource-providing entity and the resource-receiving entity. As a result of such a reverse linkage, the present invention provides for the auxiliary resources to be automatically applied, in real-time, to a subsequent, typically next-in-time, resource event conducted between the resource-providing entity and the resource-receiving entity using the linked resource storage location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
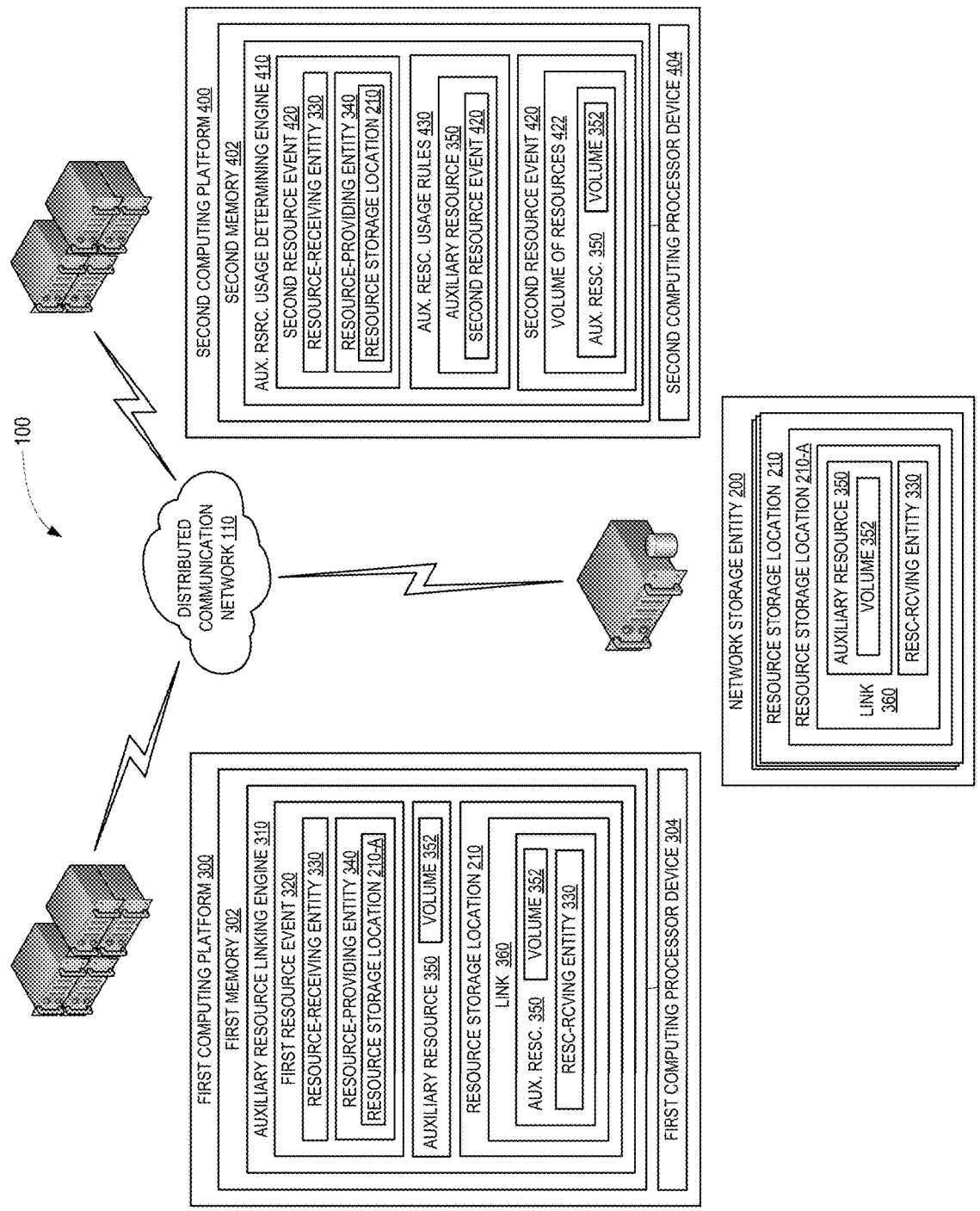
Figure 2:
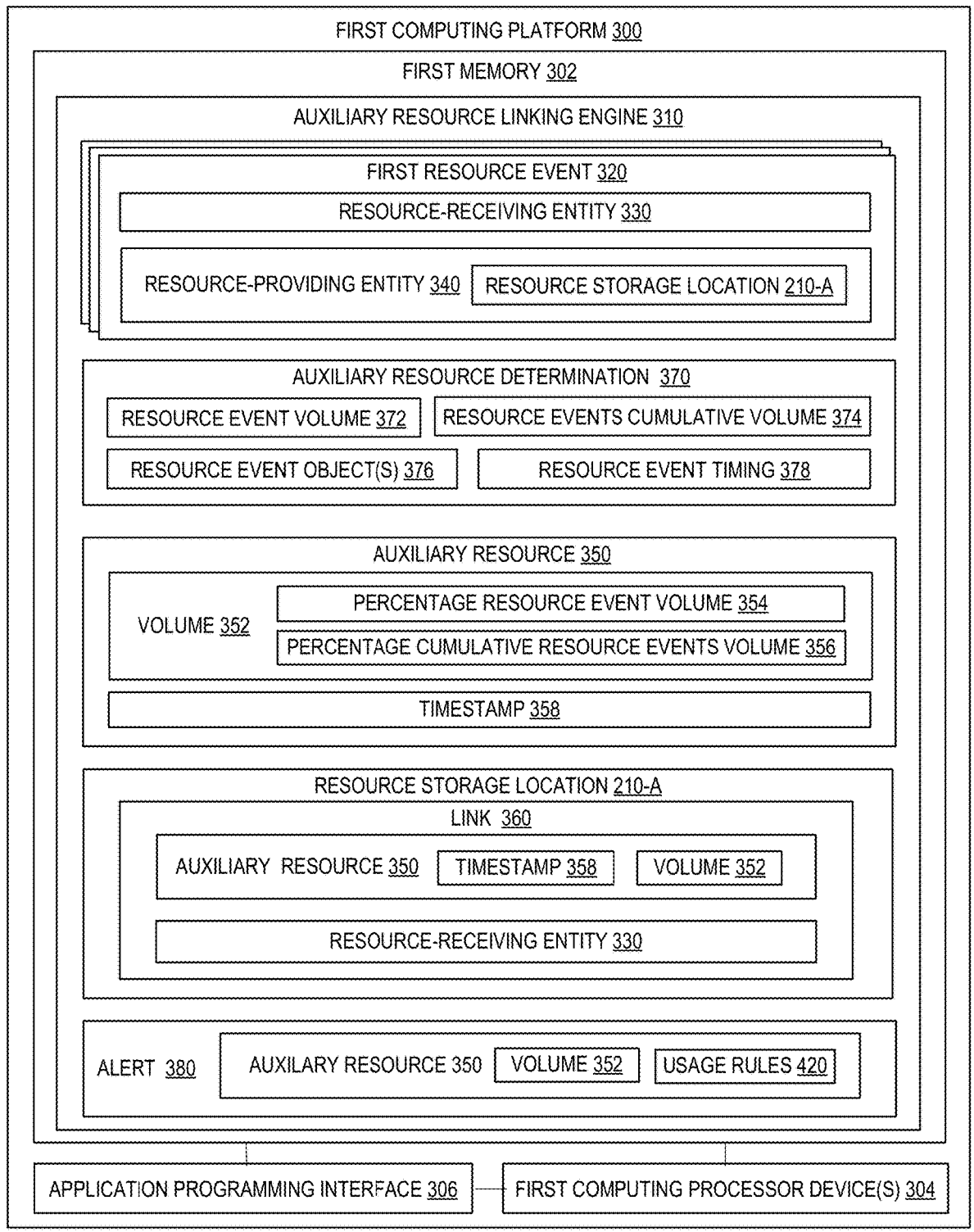
Figure 3:
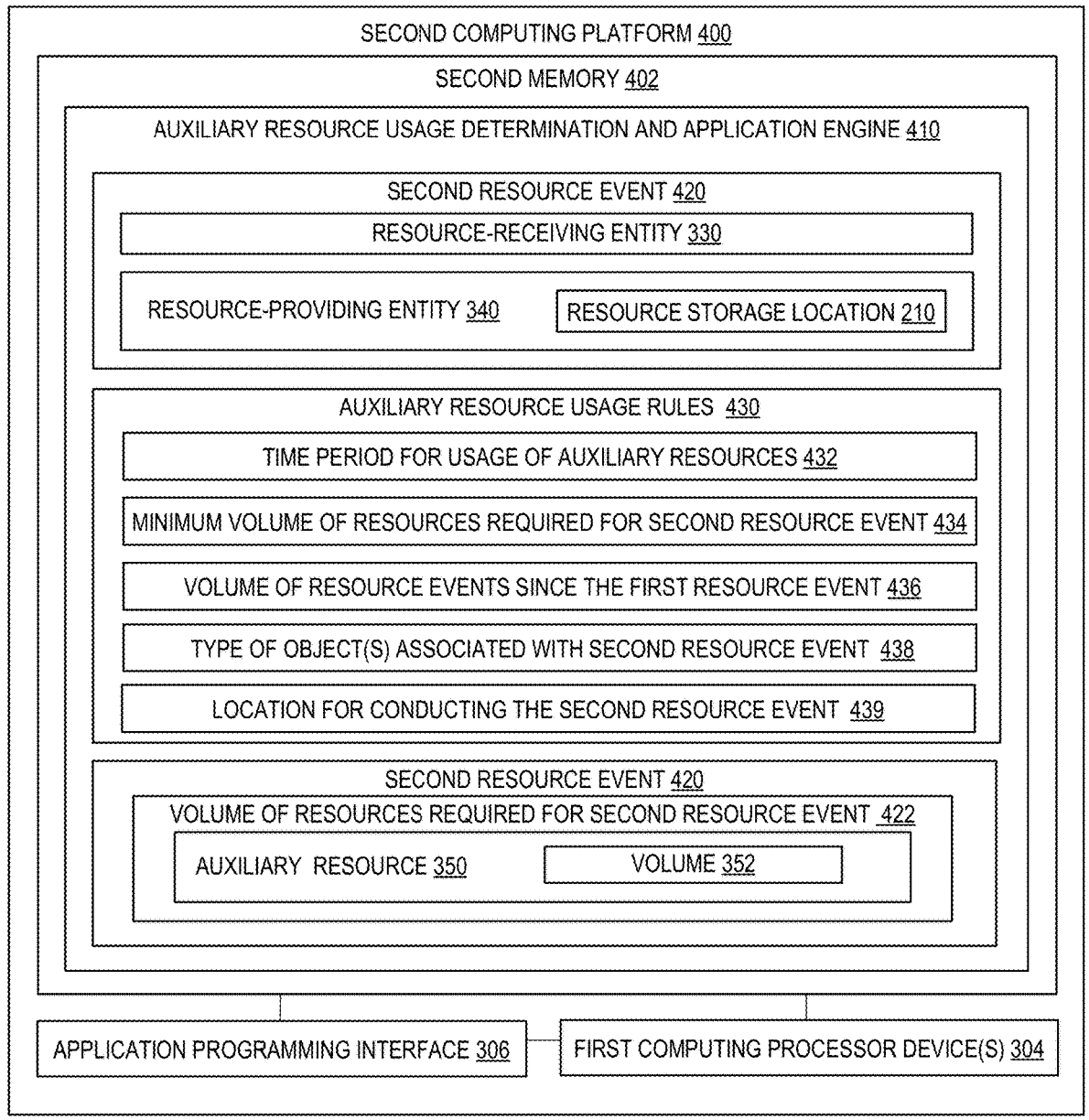
Figure 4:
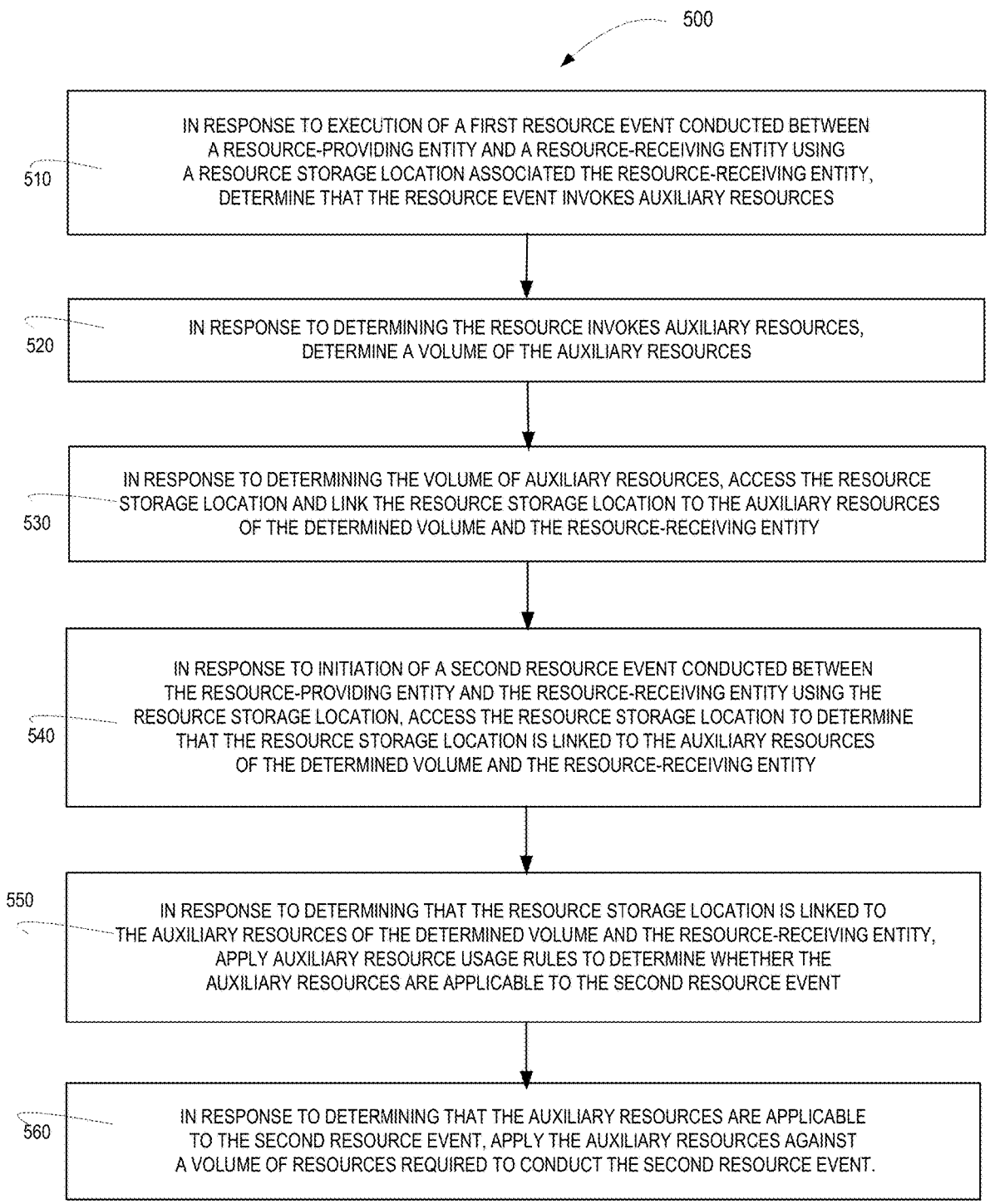

Having thus described embodiments of the disclosure in general terms, reference will now be made to the accompanying drawings, wherein:

FIG. 1 is a schematic/block diagram of a system for reverse linkage of auxiliary resources to a resource storage location and resource-receiving entity and subsequent usage of the auxiliary resources, in accordance with some embodiments of the present disclosure;

FIG. 2 is a block diagram of a computing platform including an auxiliary resource linking engine, in accordance with some embodiments of the present disclosure;

FIG. 3 is a block diagram of a computing platform including an auxiliary resource usage determination and application engine, in accordance with some embodiments of the present disclosure; and FIG. 4 is a flow diagram of a method for reverse linkage of auxiliary resources to a resource storage location and resource-receiving entity and subsequent usage of the auxiliary resources, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide reverse linkage of auxiliary resources to both a resource-receiving entity and a resource storage location associated with a resource-providing entity, in response to one or more resource events occurring between the resource-providing entity and the resource-receiving entity. As a result of such a linkage, the present invention provides for the auxiliary resources to be automatically applied, in real-time, to a subsequent, typically next-in-time, resource event conducted between the resource-providing entity and the resource-receiving entity that uses the linked resource storage location.

Specifically, in response to a resource event conducted between a resource-receiving entity and resource-providing entity that uses a resource storage location associated with the resource-providing entity, a determination is made that the first resource event invokes auxiliary resources and, in response, determines the volume of the auxiliary resources and subsequently links the auxiliary resources to the resource-providing entity and the resource storage location. When a subsequent resource event occurs between the resource-providing entity and the resource-receiving entity, the link between the auxiliary resources and both the resource-providing entity and the resource storage location is acknowledged, and auxiliary resource usage rules are implemented to determine whether the auxiliary resources are applicable to the subsequent resource event. If it is determined that the auxiliary resources are applicable to the subsequent resource event, the auxiliary resources are applied against the volume of resources required to conduct the subsequent resource event.

In specific embodiments of the invention, in which the first resource event is a transaction between, for example, a user/customer (e.g., resource-providing entity) and a merchant (e.g., resource-receiving entity) and the auxiliary resources are a reward, such as a cash amount or the like, the reverse linkage provides for the payment account (e.g., resource location) to be linked to both a rewards and the merchant, in response to one or more transaction occurring between the user/customer and the merchant using the payment account. As a result of such linkages, in accordance with specific embodiments of the present invention, the rewards, such as a specific cash amount, is automatically applied, in real-time (i.e., at the time the transaction is occurring) to a subsequent, typically the next-in-time, transaction between the user/customer and merchant when the user/customer uses the same payment account.

Specifically, according to embodiments of the present invention, in response to a transaction occurring between a merchant (e.g., online or brick and mortar) and user customer that uses a specific user/customer payment account (e.g., specific debit/credit card or the like), a determination is made that the first resource event invokes auxiliary resources (e.g., transaction above a specified amount, transaction includes specified products or the like) and, in response, determines the amount of the reward (e.g., flat rate amount or percentage of total transaction amount) and subsequently provides a link in the payment account to the reward and the merchant. When a subsequent transaction occurs between the user/customer and the merchant, the link in the payment account to the reward and the merchant is acknowledged, and reward usage rules are implemented to determine whether the reward is applicable to the subsequent transaction (e.g., with time limits, above a specified purchase amount, for specified products or the like). If it is determined that the rewards are applicable to the subsequent transaction, the rewards/cash amount are applied, at the time of sale, against the overall transaction amount needed to conduct the transaction.

Turning now to the figures, FIG. 1 a schematic diagram is provided of a system 100 for reverse linkage of auxiliary resources to a resource storage location and resource-receiving entity and subsequent usage of the auxiliary resources, in accordance with embodiments of the present invention. The system 100 is implemented within a distributed communication network 110, which may include one or more cellular networks, the Internet, one or more intranets, or the like. The system 100 includes network storage entity 200 that is configured to provide for a plurality of resource storage locations 210 configured to store resources. Additionally, system 100 includes first computing platform 300 that is in network communication, via distributed communication network 110, with network storage entity 200. First computing platform 300 includes first memory 302 and one or more first computing processor devices 304 that are in communication with first memory 302. First memory 302 stores auxiliary resource linking engine 310 that is executable by at least one of first computing processor device(s) 304.

Auxiliary resource linking engine 310 is configured to, in response to execution of a first resource event 3210 conducted between a resource-receiving entity 330 and a resource-providing entity 340 using a resource storage location 210-A from amongst the plurality of resource storage locations 210 that is associated with the resource-providing entity 340, determine that the first resource event 320 invokes auxiliary resources 350, and, in response, determine a volume 352 of the auxiliary resources 350. In response to determining the volume 352 of auxiliary resources 350, auxiliary resource linking engine 310 is configured to access the network storage entity 200 to link 360 the resource storage location 210-A to (i) the auxiliary resources 350 of the determined volume 352 and (ii) the resource-receiving entity 330.

Additionally, system 100 includes second computing platform 400 that is in network communication, via distributed communication network 110, with network storage entity 200. Second computing platform 400 includes second memory 402 and one or more first computing processor devices 404 that are in communication with second memory 402. Second memory 402 stores auxiliary resource usage determining and application engine 410 that is executable by at least one of second computing processor device(s) 404. Those of ordinary skill in the art will appreciate that the functionality described herein with regards to first computing platform 300 and second computing platform 400 may be executed in a single computing platform, thus, in certain embodiments, obviating the need for two separate computing platforms.

Auxiliary resource usage determining and application engine 410 is configured to, in response to initiation of second resource event 420 conducted between the resource-receiving entity 330 and the resource-providing entity 340 using the resource storage location 210-A, access the network storage entity 200 to determine that the resource storage location 210-A is linked to the auxiliary resources 350 and the resource-receiving entity 330. In response to determining that the resource storage location 210-A is linked to the auxiliary resources 350 and the resource-receiving entity 330, auxiliary resource usage determining and application engine 410 is configured to apply auxiliary resource usage rules 420 to determine whether the auxiliary resources 350 are applicable to the second resource event 430. Further, in response to determining that the auxiliary resources 350 are applicable to the second resource event 430, auxiliary resource usage determining and application engine 410 is configured to apply the auxiliary resources 350 against a volume of resources 422 required to conduct the second resource event 420.

Referring to FIG. 2, a block diagram is presented of first computing platform 300 including auxiliary resource linking engine 310, in accordance with embodiments of the present invention. In addition to providing greater details of the auxiliary resource linking engine 310, FIG. 2 highlights various alternate embodiments of the invention. First computing platform 300, which may comprise more than one computing devices, such as application servers or the like, includes first memory 302, which may comprise volatile and non-volatile memory, such as read-only and/or random-access memory (RAM and ROM), EPROM, EEPROM, flash cards, or any memory common to computing platforms). Moreover, first memory 302 may comprise cloud storage, such as provided by a cloud storage service and/or a cloud connection service.

Further, first computing platform 300 also includes at least one first processing device 304, which may be an application-specific integrated circuit ("ASIC"), or other chipset, logic circuit, or other data processing device. First processing device(s) 304 may execute one or more application programming interface (APIs) 306 that interface with any resident programs, such as auxiliary resource linking engine 310 or the like, stored in first memory 302 of first computing platform 300 and any external programs. First processing devices(s) 304 may include various processing subsystems (not shown in FIG. 2) embodied in hardware, firmware, software, and combinations thereof, that enable the functionality of first computing platform 300 and the operability of first computing platform 300 on the distributed communication network 110 (shown in FIG. 1). For example, processing subsystems allow for initiating and maintaining communications and exchanging data with other networked devices. For the disclosed aspects, processing subsystems of first processing device(s) 304 may include any subsystem used in conjunction with auxiliary resource linking engine 310 and related tools, routines, sub-routines, algorithms, sub-algorithms, sub-modules thereof.

First computing platform 300 may additionally include a communications module (not shown in FIG. 2) embodied in hardware, firmware, software, and combinations thereof, that enables electronic communications between the first computing platform 300 and other networks and network devices, such as network storage entity 200 shown in FIG. 1. Thus, communication module may include the requisite hardware, firmware, software and/or combinations thereof for establishing and maintaining a network communication connection with one or more devices and/or networks.

First memory 302 of first computing platform 300 stores auxiliary resource linking engine 310 that is executable by at least one of first computing processor device(s) 304. In response to execution of a first resource event 3210 conducted between a resource-receiving entity 330 and a resource-providing entity 340 using a resource storage location 210-A from amongst the plurality of resource storage locations 210 that is associated with the resource-providing entity 340, determine that the first resource event 320 invokes auxiliary resources 350. Such an auxiliary resource determination 370 may include, but is not limited to, determining that (i) the first resource event 320 exceeds a resource event volume 372, (ii) resource events including the first resource event 320 between the resource-providing entity 340 and the resource-receiving entity 330 using the resource storage location 210-A exceed a cumulative event volume 374, (iii) the first resource event 320 includes one or more predetermined objects 376 and/or (iv) the first resource event meets predetermined timing requirements 378.

In specific embodiments of the invention, in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), reward, such as cash-back or the like, (e.g., auxiliary resource) determination may include, but is not limited to, determining that (i) the transaction amount exceeds predetermined transaction amount, (ii) multiple transactions including the current transaction between the user/customer and the merchant using the same payment account exceed a predetermined cumulative transaction amount, (iii) the transaction includes one or more predetermined products or services and/or (iv) the transaction meets predetermined timing requirements (e.g., before a predetermined date, time of day, week, month or the like).

In response to determining that the first resource event 320 invokes auxiliary resources 350, auxiliary resource linking engine 310 is further configured to determine a volume 352 of the auxiliary resources 350. The volume may be determined based on a predetermined percentage of the first resource event 320 volume 354 or a predetermined percentage of the cumulative volume 356 of multiple resource between the resource-providing entity 340 and the resource-receiving entity 330 using the same resource storage location 210-A.

In specific embodiments of the invention, in which in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), the amount of the reward, such as cash-back or the like, may be a predetermined percentage of the transaction amount or a predetermined percentage of the cumulative amount of multiple transactions between the user/customer and merchant using the same payment account, e.g., same debit card, credit card, digital wallet account or the like.

In response to determining the volume 352 of auxiliary resources 350, auxiliary resource linking engine 310 is configured to access the network storage entity 200 to link 360 the resource storage location 210-A to (i) the auxiliary resources 350 of the determined volume 352 and (ii) the resource-receiving entity 330. In specific embodiments of the invention, in which in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), the link 360 serves to link the payment account to the reward (e.g., specific cash-back amount or the like) and the merchant.

In specific embodiments of the invention, a timestamp 358 is applied to auxiliary resources 350 prior to linking the auxiliary resources 350 to the resource storage location 210. In such embodiments of the invention, the link 360 between the resource storage location 210-A and the auxiliary resources 350 of the determined volume 352 and the resource-receiving entity 330 may be configured to expire after a predetermined period of time as determined from the timestamp 358. In specific embodiments of the invention, in which in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), the link 360 between the payment account and the reward, such as cash-back or the like may be configured to expire after a predetermined period of time as determined from the timestamp 358.

In specific embodiments of the invention, in response to linking 360 the resource storage location 210 to the auxiliary resource 350 and resource-receiving entity 330, the auxiliary resource linking engine 310 is further configured to generate and initiate communication of alert 380 to the resource-providing entity 340 that notifies the resource-receiving entity 340 of the auxiliary resources 350, the volume 352 of auxiliary resources 352 and the applicable auxiliary resource usage rules 420. In specific embodiments of the invention, in which in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), the alert 380 is communicated to the user/customer and notifies of the reward, the reward amount and the rules associated with using the reward.

Referring to FIG. 3, a block diagram is presented of second computing platform 400 including auxiliary resource usage determination and application engine 410, in accordance with embodiments of the present invention. In addition to providing greater details of the auxiliary resource usage determination and application engine 410, FIG. 3 highlights various alternate embodiments of the invention. Second computing platform 400, which may comprise more than one computing devices, such as application servers or the like, includes second memory 402, which may comprise volatile and non-volatile memory, such as read-only and/or random-access memory (RAM and ROM), EPROM, EEPROM, flash cards, or any memory common to computing platforms). Moreover, second memory 402 may comprise cloud storage, such as provided by a cloud storage service and/or a cloud connection service.

Further, second computing platform 400 also includes at least one second processing device 404, which may be an application-specific integrated circuit ("ASIC"), or other chipset, logic circuit, or other data processing device. Second processing device(s) 404 may execute one or more application programming interface (APIs) 406 that interface with any resident programs, such as auxiliary resource usage determination and application engine 410 or the like, stored in second memory 402 of second computing platform 400 and any external programs. Second processing devices(s) 404 may include various processing subsystems (not shown in FIG. 3) embodied in hardware, firmware, software, and combinations thereof, that enable the functionality of second computing platform 400 and the operability of first computing platform 400 on the distributed communication network 110 (shown in FIG. 1). For example, processing subsystems allow for initiating and maintaining communications and exchanging data with other networked devices. For the disclosed aspects, processing subsystems of second processing device(s) 404 may include any subsystem used in conjunction with auxiliary resource usage determination and application engine 410 and related tools, routines, sub-routines, algorithms, sub-algorithms, sub-modules thereof.

Second computing platform 400 may additionally include a communications module (not shown in FIG. 3) embodied in hardware, firmware, software, and combinations thereof, that enables electronic communications between the second computing platform 400 and other networks and network devices, such as network storage entity 200 shown in FIG. 1. Thus, communication module may include the requisite hardware, firmware, software and/or combinations thereof for establishing and maintaining a network communication connection with one or more devices and/or networks.

Second memory 402 of second computing platform 400 stores auxiliary resource usage determination and application engine 410 that is executable by at least one of second computing processor device(s) 404. In response to initiation of second resource event 420 conducted between the resource-receiving entity 330 and the resource-providing entity 340 using the resource storage location 210-A, auxiliary resource usage determination and application engine 410, access the network storage entity 200 to determine that the resource storage location 210-A is linked to the auxiliary resources 350 and the resource-receiving entity 330. In response to determining that the resource storage location 210-A is linked to the auxiliary resources 350 and the resource-receiving entity 330, auxiliary resource usage determining and application engine 410 is configured to apply auxiliary resource usage rules 420 to determine whether the auxiliary resources 350 are applicable to the second resource event 430. The auxiliary resource usage rules 430 may include, but are not limited to, (i) time period 432 for usage of auxiliary resources 350, (ii) minimum volume 434 of resources required for second resource event 420, (iii) volume of resource events 436 since the first resource event 320, (iv) type of objects 438 associated with the second resource event 420, and (v) location 439 (online, physical or the like) for conducting the second resource event 420). In specific embodiments of the invention, in which in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), the reward usage rules may include, but are not limited to, (i) time period 432 for usage of rewards (e.g., a up to a week, a month or the like from the first transaction, i.e., the transaction which triggered the reward), (ii) minimum amount for the second transaction, (iii) number of transactions since the first transaction (i.e., reward may applied for only the next-in-time transaction or a predetermined number of transactions), (iv) type of products/services being conveyed in the second transaction, and (v) location for conducting the transaction (i.e., whether the transaction can conducted online, at a physical merchant location or both).

Further, in response to determining that the auxiliary resources 350 are applicable to the second resource event 430, auxiliary resource usage determining and application engine 410 is configured to apply the auxiliary resources 350 against a volume of resources 422 required to conduct the second resource event 420. In specific embodiments of the invention, the auxiliary resources 350 are applied while the second resource event 420 is occurring, such that the volume of resources required to conduct the second resource event 420 reflects a deduction equal to the volume 352 of auxiliary resources 350. In specific embodiments of the invention, in which in which first resource event 320 is a transaction conducted between a user/customer (e.g., resource-providing entity 340) and an online or brick and mortar merchant (e.g., resource-receiving entity 330) using a payment account, such as a debit card, credit card, digital wallet or the like (e.g., resource storage location), the reward is applied against the transaction amount and, in specific embodiments the reward is applied while the transaction is occurring, such that the transaction amount that the user/customer is required to remit reflects a deduction in the amount of the reward.

Referring to FIG. 4, a flow diagram is presented of a method 500 for reversing linkage of auxiliary resources to a resource storage location and a resource-receiving entity and subsequent auxiliary resource usage, in accordance with embodiments of the present invention. In response to execution of a first resource event conducted between a resource-providing entity and a resource-receiving entity using a resource storage location is associated with the resource-providing entity, at Event 510, a determination is made that the first resource event invokes auxiliary resources. In response to determining that the first resource event invokes auxiliary resources, at Event 520, volume of the auxiliary resources is determined, such as a percentage of the resources required to execute the first resource event or a flat volume or resources.

In response to determining the volume of auxiliary resources, at Event 530, the resource storage location is accessed and the resource storage location is linked to the auxiliary resources of the determined volume and the resource-receiving entity. In specific embodiments of the method, a timestamp is applied to the auxiliary resources prior to linking the auxiliary resources to resource storage location. The timestamp may be implemented for purposes of auxiliary resource expiration (i.e., no longer valid/applicable after a certain predetermined period of time).

In response to initiation of a second resource event conducted between the resource-providing entity and the resource-receiving entity using the same resource storage location, at Event 540, the resource storage location is accessed to determine that the resource storage location is linked to the auxiliary resources of the determined volume and the resource-receiving entity. In response to determining that the resource storage location is linked to the auxiliary resources of the determined volume and the resource-receiving entity, at Event 550 auxiliary resource usage rules are applied to determine whether the auxiliary resources are applicable to the second resource event. In response to determining that the auxiliary resources are applicable to the second resource event, at Event 560, the auxiliary resources are applied against a volume of resources required to conduct the second resource event.

Thus, present embodiments of the invention provide for reverse linkage of auxiliary resources to both a resource-receiving entity and a resource storage location associated with a resource-providing entity. The reverse nature of the linkage is realized, in that, the linkage occurs in response to one or more resource events occurring between the resource-providing entity and the resource-receiving entity. As a result of such a reverse linkage, the present invention provides for the auxiliary resources to be automatically applied, in real-time, to a subsequent, typically next-in-time, resource event conducted between the resource-providing entity and the resource-receiving entity using the linked resource storage location.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

INCORPORATION BY REFERENCE

To supplement the present disclosure, this application further incorporates entirely by reference the following commonly assigned patent applications:

| U.S. patent application Ser. No. | Title | Filed On |
|---|---|---|
| 17/582,399 | SYSTEM FOR TRIGGERING ADAPTIVE RESOURCE CHANNEL REQUISITION WITHIN A DISTRIBUTED NETWORK | Jan. 24, 2022 |

What is claimed is:

1. A system for reverse auxiliary resource linkage and auxiliary resource usage, the system comprising:
   a network storage entity configured to provide a plurality of resource storage locations; and
   a first computing platform including a first memory and one or more first computing processor devices in communication with the first memory, wherein the first memory stores an auxiliary resource linking engine that is executable by at least one of the computing processor devices and configured to:
      in response to execution of a first resource event conducted between a resource-providing entity and a resource-receiving entity using a resource storage location from amongst the plurality of resource storage locations that is associated with the resource-providing entity, determine that the first resource event invokes auxiliary resources,
      in response to determining the first resource event invokes auxiliary resources, determine a volume of the auxiliary resources based on a predetermined percentage of a cumulative volume of resources required to conduct a plurality of resource events between the resource-providing entity and the resource-receiving entity, and
      in response to determining the volume of auxiliary resources, (i) access the network storage entity, (ii) apply a timestamp to the auxiliary resources, and (iii) and link the resource storage location to the auxiliary resources of the determined volume and the resource-receiving entity, wherein an availability of the auxiliary resources are configured to expire after a predetermined period of time as determined from the timestamp, wherein the timestamp is applied prior to the linking,
   wherein, in response to applying the timestamp, the auxiliary resource linking engine is further configured to initiate communication of an alert to the resource-providing entity indicating a time period for usage of the auxiliary resources; and a second computing platform including a second memory and one or more second computing processor devices in communication with the second memory, wherein the second memory stores an auxiliary resource usage determining and application engine that is executable by at least one of the computing processor devices and configured to:
      in response to initiation of a second resource event conducted between the resource-providing entity and the resource-receiving entity using the resource storage location, access the network storage entity to determine that the resource storage location is linked to the auxiliary resources of the determined volume and the resource-receiving entity,
      in response to determining that the resource storage location is linked to the auxiliary resources of the determined volume and the resource-receiving entity, apply auxiliary resource usage rules to determine whether the auxiliary resources are applicable to the second resource event, and
      in response to determining that the auxiliary resources are applicable to the second resource event, apply the auxiliary resources against a volume of resources required to conduct the second resource event.

2. The system of claim 1, wherein the auxiliary resource linking engine is further configured to:
   determine that the first resource event invokes auxiliary resources based on (i) a volume of resources required to conduct the first resource event or (ii) a predetermined cumulative volume of resources required to conduct a plurality of resource events between the resource-providing entity and the resource-receiving entity.

3. The system of claim 1, wherein the auxiliary resource linking engine is further configured to:
   determine that the first resource event invokes auxiliary resources based on a type of one or more objects distributed in the first resource event.

4. The system of claim 1, wherein the auxiliary resource usage determining and application engine is further configured to apply the auxiliary resource usage rules to determine whether the auxiliary resources are applicable to the second resource event, wherein the auxiliary resource usage rules define one or more of (i) a time period for usage of the auxiliary resources, (ii) a minimum volume of resources required to conduct the second resource event, (iii) a volume of resource events conducted between the resource-providing entity and the resource-receiving entity since the first resource event, and (iv) a type of object being conveyed in the second resource event.

5. The system of claim 1, wherein the auxiliary resource linking engine is further configured to, in response to linking the resource location to the auxiliary resources of the determined volume and the resource-receiving entity, initiate communication, to the resource-providing entity, of an alert that includes the determined volume of the auxiliary resources and applicable auxiliary resource usage rules.

6. A computer-implemented method for reverse auxiliary resource linkage and usage, the computer-implemented method is executed by one or more computing processor devices and comprising:
   in response to execution of a first resource event conducted between a resource-providing entity and a resource-receiving entity using a resource storage location associated the resource-receiving entity, determining that the first resource event invokes auxiliary resources;
   in response to determining first resource event invokes auxiliary resources, determining a volume of the auxiliary resources based on a predetermined percentage of a cumulative volume of resources required to conduct a plurality of resource events between the resource-providing entity and the resource-receiving entity;
   in response to determining the volume of auxiliary resources, (i) accessing the network storage entity, (ii) applying a timestamp to the auxiliary resources and subsequently initiating communication of an alert to the resource-providing entity indicating a time period for usage of the auxiliary resources, and (iii) linking the resource storage location to the auxiliary resources of the determined volume and the resource-receiving entity, wherein an availability of the auxiliary resources are configured to expire after a predetermined period of time as determined from the timestamp, wherein the timestamp is applied prior to the linking;

in response to initiation of a second resource event conducted between the resource-providing entity and the resource-receiving entity using the resource storage location, accessing the resource storage location to determine that the resource storage location is linked to the auxiliary resources of the determined volume and the resource-receiving entity;

in response to determining that the resource storage location is linked to the auxiliary resources of the determined volume and the resource-receiving entity, applying auxiliary resource usage rules to determine whether the auxiliary resources are applicable to the second resource event; and in response to determining that the auxiliary resources are applicable to the second resource event, applying the auxiliary resources against a volume of resources required to conduct the second resource event.

7. The computer-implemented method of claim 6, wherein determining that the first resource event invokes the auxiliary resources further comprises determining that the first resource event invokes the auxiliary resources based on (i) a volume of resources required to conduct the first resource event or (ii) a predetermined cumulative volume of resources required to conduct a plurality of resource events between the resource-providing entity and the resource-receiving entity.

8. The computer-implemented method of claim 6, wherein determining that the first resource event invokes the auxiliary resources further comprises determining that the first resource event invokes the auxiliary resources based on a type of one or more objects distributed in the first resource event.

9. The computer-implemented method of claim 6, wherein applying the auxiliary resource usage rules further defines the auxiliary resource usage rules as one or more of (i) a time period for usage of the auxiliary resources, (ii) a minimum volume of resources required to conduct the second resource event, (iii) a volume of resource events conducted between the resource-providing entity and the resource-receiving entity since the first resource event, and (iv) a type of object being conveyed in the second resource event.

10. The computer-implemented method of claim 6, further comprising in response to linking the resource storage location to the auxiliary resources of the determined volume and the resource-receiving entity, initiating communication, to the resource-providing entity, of an alert that includes the volume of auxiliary resources and applicable auxiliary resource usage rules.

11. A computer program product comprising:
a non-transitory computer-readable medium comprising:
a first set of codes for causing at least one computing processor device to, in response to execution of a first resource event conducted between a resource-providing entity and a resource-receiving entity using a resource storage location associated the resource-receiving entity, determine that the first resource event invokes auxiliary resources;
a second set of codes for causing at least one computing processor device to, in response to determining first resource event invokes auxiliary resources, determine a volume of the auxiliary resources based on a predetermined percentage of a cumulative volume of resources required to conduct a plurality of resource events between the resource-providing entity and the resource-receiving entity;
a third set of codes for causing at least one computing processor device to, in response to determining the volume of auxiliary resources, (i) access the network storage entity, (ii) apply a timestamp to the auxiliary resources and subsequently initiating communication of an alert to the resource-providing entity indicating a time period for usage of the auxiliary resources, and (iii) link the resource storage location to the auxiliary resources of the determined volume and the resource-receiving entity, wherein an availability of the auxiliary resources are configured to expire after a predetermined period of time as determined from the timestamp, wherein the timestamp is applied prior to the linking;
a fourth set of codes for causing at least one computing processor device to, in response to initiation of a second resource event conducted between the resource-providing entity and the resource-receiving entity using the resource storage location, access the resource storage location to determine that the resource storage location is linked to the auxiliary resources of the determined volume and the resource-receiving entity;
a fifth set of codes for causing at least one computing processor device to, in response to determining that the resource storage location is linked to the auxiliary resources of the determined volume and the resource-receiving entity, apply auxiliary resource usage rules to determine whether the auxiliary resources are applicable to the second resource event; and
a sixth set of codes for causing at least one computing processing device to, in response to determining that the auxiliary resources are applicable to the second resource event, apply the auxiliary resources against a volume of resources required to conduct the second resource event.

12. The computer program product of claim 11, wherein the first set of codes is further configured to cause the at least one computing processor device to determine that the first resource event invokes the auxiliary resources based on (i) a volume of resources required to conduct the first resource event or (ii) a predetermined cumulative volume of resources required to conduct a plurality of resource events between the resource-providing entity and the resource-receiving entity.

13. The computer program product of claim 11, wherein the first set of codes is further configured to cause the at least one computing processor device to determine that the first resource event invokes the auxiliary resources based on a type of one or more objects distributed in the first resource event.

14. The computer program product of claim 11, wherein the fifth set of codes is further configured to cause the at least one computing processor device to apply the auxiliary resource usage rules, wherein the auxiliary resource usage rules are defined as one or more of (i) a time period for usage of the auxiliary resources, (ii) a minimum volume of resources required to conduct the second resource event, (iii) a volume of resource events conducted between the resource-providing entity and the resource-receiving entity since the first resource event, and (iv) a type of object being conveyed in the second resource event.

* * * * *